Dec. 4, 1928.
R. C JONES
GLUING MACHINE
Filed June 11, 1927    2 Sheets-Sheet 1
1,693,606
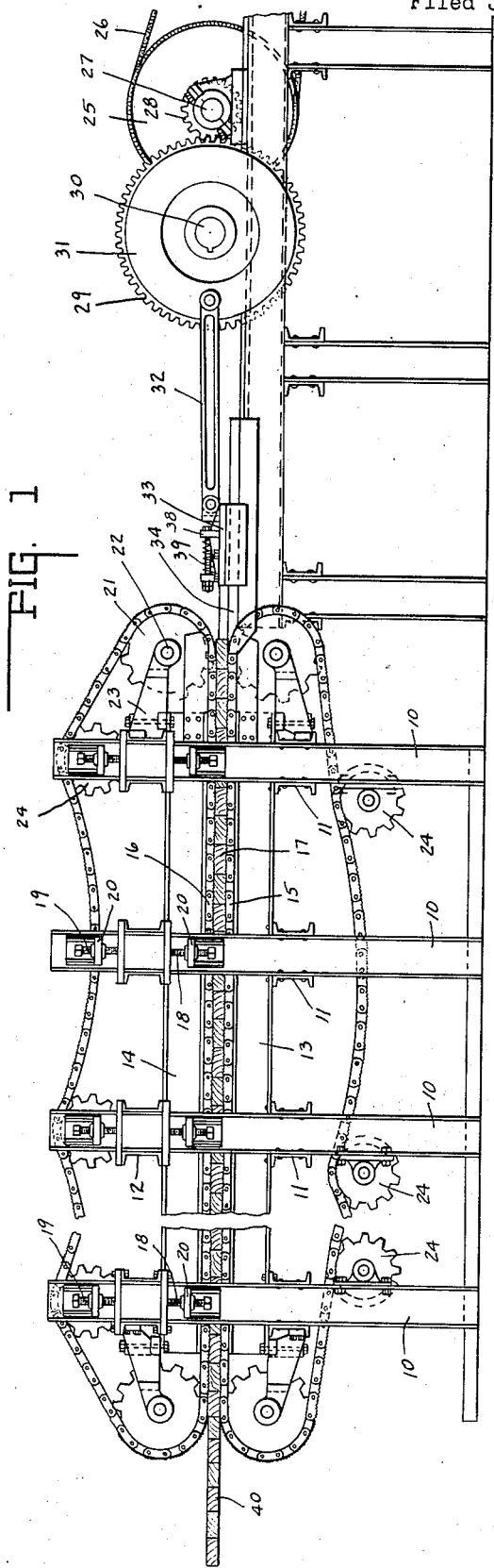
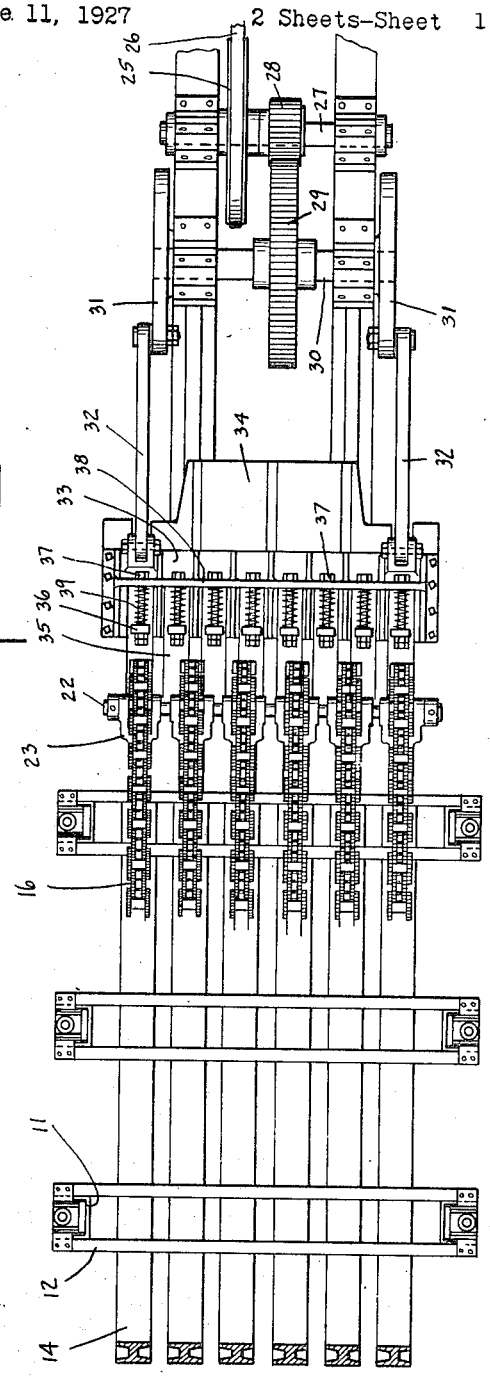
INVENTOR.
RICHARD COCKE JONES.
BY DAPHNE SELDEN JONES, ADM'R'X.
BY
ATTORNEYS.

Dec. 4, 1928.
R. C JONES
1,693,606
GLUING MACHINE
Filed June 11, 1927     2 Sheets-Sheet 2
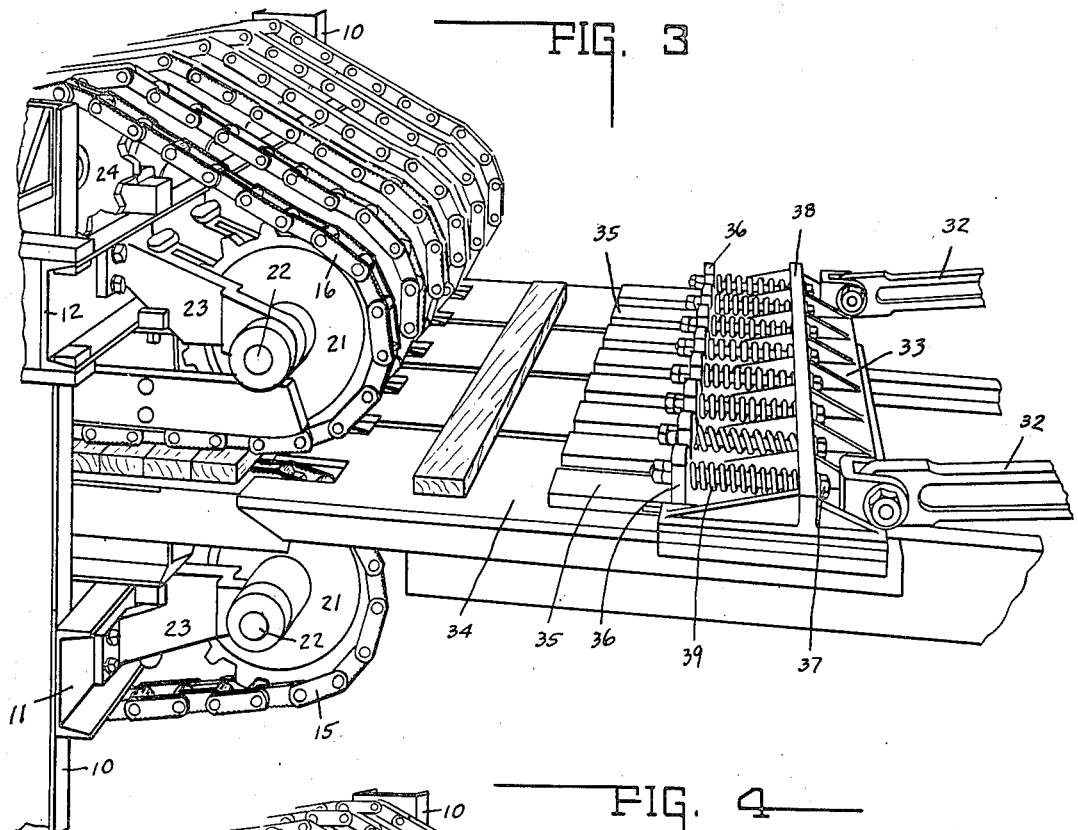
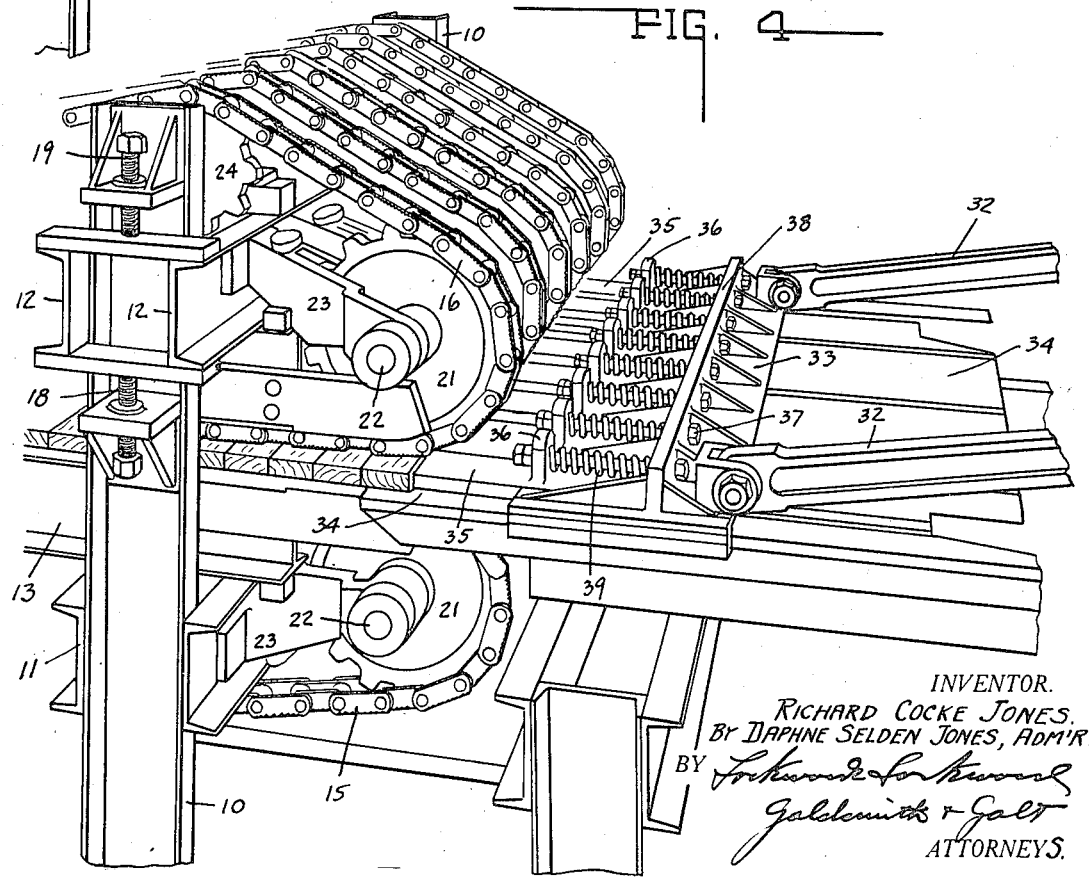
INVENTOR.
RICHARD COCKE JONES.
BY DAPHNE SELDEN JONES, ADM'R'X.
BY
ATTORNEYS.

Patented Dec. 4, 1928.

1,693,606

UNITED STATES PATENT OFFICE.

RICHARD COCKE JONES, DECEASED, LATE OF LOUISVILLE, KENTUCKY; BY DAPHNE SELDEN JONES, ADMINISTRATRIX, OF LOUISVILLE, KENTUCKY, ASSIGNOR TO GAMBLE BROTHERS, INC., OF LOUISVILLE, KENTUCKY, A CORPORATION.

GLUING MACHINE.

Application filed June 11, 1927. Serial No. 198,224.

This invention pertains to an automatic glue jointer for gluing up strips of wood and joining them together to form a board or panel of the usual character.

The principal feature of the invention consists in providing a continuous chain clamping machine for receiving strips of stock to be glued together, forcing them one against the other with their glued edges abutting and clamping them in such position for holding them firmly together until the glue sets, while simultaneously carrying them along a continuous flat surface until discharged at the end of the machine with their joints or abutting edges firmly adhering for providing the desired boards or panels.

The principal feature of this invention resides in a machine which automatically sets and aligns the strips or boards with respect to each other, presses them in clamping position and thereafter maintains them in such clamped position during their carriage to the discharge end of the machine where they are received in their finished form. In this connection it is only necessary for the operator to apply the glue to the edge of the board or strip and place it on the machine without requiring any specific positioning or manual alignment thereof.

Other features of the invention will be hereinafter more fully set forth.

The full nature of the invention will be understood from the accompanying drawings and the following description and claims:

In the drawings, Figure 1 is a side elevation of the machine showing the clamping plungers in clamping position. Fig. 2 is a plan view thereof. Fig. 3 is an enlarged perspective view showing the clamping plungers withdrawn and a board in place to be operated upon. Fig. 4 is the same as Fig. 3, showing the board forced into clamping position.

In the drawings there is shown a machine comprising a plurality of upright supporting standards 10 of the usual I-beam construction, there being secured thereto a number of lower cross beams 11 and upper cross beams 12. Supported longitudinally of the machine upon the lower cross beams 11 there is a plurality of supporting tracks 13 formed of I-beams, and immediately above the same there are corresponding compression tracks 14 similarly formed of I-beams. Said tracks are so spaced apart as to permit the lower clamping chains 15 and the upper clamping chains 16 to pass therebetween with sufficient space between said chains to receive and clamp the boards or strips 17.

While the under tracks 13 are permanently fixed, the upper tracks 14 are adjustably supported by means of the set screws 18 and 19 which engage the top and bottom of the cross beams 12 to which the upper track 14 is rigidly secured. Said cross beams 12 are slidably mounted on the upright supports 10 and the adjusting screws 18 are supported by the angle iron brackets 20 mounted on the vertical supports 10. By adjusting the screws 18 and 19, the clamping pressure between the chains may be varied, while at the same time the space between the chains may be altered to accommodate varying thicknesses of strips 17.

The chains 15 and 16 are carried by the sprocket wheels 21 at each end of the machine, said sprocket wheels being supported on the shafts 22 mounted in the end brackets 23. Intermediate the end sprockets 21 there is a plurality of supporting sprockets 24 mounted on the uprights 10 over which the chain is carried.

At the feeding end of the machine, there is provided a driving pulley 25 having peripheral teeth for receiving the high speed driving chain or belt 26 driven from a motor or any other suitable source of power, not shown herein. Said driving pulley 25 is keyed to a shaft 27 which is supported horizontally of the machine in suitable bearings 28. Keyed to the shaft 27, so as to be driven thereby, there is a pinion 28 in position to mesh with a gear 29 which is keyed to the shaft 30. If desired, other additional speed reduction gears or mechanism may be interposed for driving the gear 29 at the desired speed of rotation. At each end of the shaft 30 there is a driving disk 31 having pivoted near the periphery thereof one end of the connecting rods 32, said connecting rods being pivoted at the other end to the jointer block or plunger 33 which is slidably mounted on guideways formed on the table surface 34 so as to reciprocate back and forth thereon as the gear 29 is rotated. Mounted on the block and slidable with respect thereto there is a plurality of laterally projecting fingers 35 having upwardly extending projections 36 thereon for receiving the bolts 37 which extend through said projections 36 and the laterally extending rib 38 of the block 33. Intermediate the projection 36 and the rib 38 and surrounding said bolts there are relatively stiff compression springs 39. By means of this mounting and the springs 39, the fingers 35 are permitted to give with respect to the block under sufficient pressure to compress the springs 39.

In the operation of the machine, a free board or wood strip is placed on the table 34 in position to be gripped between the gripping chains 15 and 16. It will be noted that the gripping surface or edge of said chains is provided with small teeth for preventing the board or strip from sliding therebetween, thus enabling the chain to more readily grip the same. After such board has been placed in position, a second board is placed upon the table with glue applied to the edge thereof adjacent the first-mentioned board. The reciprocating movement of the jointer block will then cause the forward ends of the fingers 35 to engage the other edge of the board and force it against the first-mentioned board. The force exerted thereby will force the boards together under appreciable pressure so that their glued edges will adhere and force them between the chains along the machine which will act to carry the gripping chains with them and thereby slidably move the chains and their supporting gears. The operation is continued by placing a board having a suitable glued edge on the table 34 in position upon every revolution of the gear 29 or complete reciprocatory movement of the jointer block or plunger 33.

Each forward movement of the block and the fingers 35 will accordingly force a new board with its glued edge against the adjacent edge of the last board operated upon. This will feed one board after another between the chains and keep pushing them forwardly through the machine. The initial pressure exerted in forcing the boards against each other and against the friction and resistance of the clamping chains and their gears will firmly secure the glued edges together and they will be held in such position by the clamping chains as they are forced on down therebetween to the discharge end of the machine. This action continues until a suitable number of boards have been forced with their glue covered edges together to form a panel of the desired width. At this point, a board is placed on the machine without any glue on its edge so that there will be a break. But the board follows the preceding board and forces the panel on through the machine just the same. Thus, assuming that the panel comprises five boards, the sixth board will have no glue on its abutting edge, but it will be immediately followed by boards having glue applied to their edges.

It will be apparent, therefore, that the clamping chains 15 and 16 idle, but the frictional resistance to their movement is such that appreciable pressure must be applied against the boards, as they are fed between the chains, to properly joint them.

It will be noted that the operator may feed boards having glue applied to their edges onto the table as fast as the machine will operate, one for every revolution of the gear 29 and these boards will be gradually forced through the machine to the discharge end. The machine is built of sufficient length so that by the time the boards reach the discharge end, and during which passage they are firmly gripped in compressed relation to each other, the glue has been sufficiently set to permit them to be removed. In this connection a panel comprising a number of boards, as indicated by "40", is shown being discharged from the end of the machine in Fig. 1, an operator being positioned at this point to remove the panel when the break comes between two boards having no glue between them, and remove it to its proper place. Suitable conveyor belts or other means may be employed at this end of the machine for automatically removing the panels in any desired manner.

The invention claimed is:

1. A machine of the character described, comprising a plurality of upper clamping chains, a plurality of lower clamping chains, a plurality of idler sprocket wheels for carrying said chains and permitting them to be moved longitudinally of the machine, said upper and lower chains being so spaced from each other as to permit a plurality of aligned boards to be clamped therebetween, and means for forcing said boards together against the resistance exerted in the movement of said chains for jointing them and simultaneously moving said boards and chains towards the discharge end of said machine.

2. A machine of the character described comprising a plurality of endless clamping chains mounted above the bed thereof, a plurality of endless clamping chains mounted below the bed thereof and associated therewith for engaging and clamping a plurality of aligned boards therebetween, a plurality of idler sprocket wheels for carrying said chains, a plurality of tracks on each side of said bed over which said chains are adapted to pass for maintaining them in their spaced relation and clamping position with respect to said boards, and means for forcing said boards one against the other for introducing them between said clamping chains and forcing the boards clamped thereby and said chains longitudinally of said machine toward the discharge end thereof.

3. A machine of the character described, comprising a plurality of endless clamping chains mounted above the bed thereof, a plurality of endless clamping chains mounted below the bed thereof and associated therewith for engaging and clamping a plurality of aligned boards therebetween, a plurality of idler sprocket wheels for carrying said chains, a plurality of tracks on each side of said bed over which said chains are adapted to pass for maintaining them in their spaced relation and clamping position with respect to said boards, means for adjusting said upper and lower clamping chains with respect to each other for clamping them to various widths of boards and varying the pressure thereon, and means for forcing said boards one against the other for introducing them between said clamping chains and forcing the boards clamped thereby and said chains longitudinally of said machine toward the discharge end thereof.

4. A machine of the character described, comprising a plurality of vertical upright supports, a plurality of lower horizontal supports secured thereto, means for adjusting the height of said upper horizontal supports so as to vary their position with respect to said lower supports, a plurality of sprocket wheels mounted on said lower and upper horizontal supports, a plurality of endless clamping chains carried by said sprockets, longitudinal guide tracks secured to said upper and lower horizontal supports respectively over which said chains are adapted to slide, friction surfaces formed on said chains adapted to engage and clamp a plurality of boards therebetween, and means for forcing said boards between said chains in position to be engaged and clamped thereby for causing pressure to be applied between said boards against the resistance offered by said chains and simultaneously cause said boards to be clamped in abutting position thereby and forced longitudinally of said machine with said chains to the discharge end thereof while held in clamped position under pressure by each succeeding board forced thereagainst.

5. In a machine of the character described, a pair of longitudinally-movable gripping members between which a plurality of jointed boards may be clamped and held in position with respect to each other, a plunger block slidably mounted on said machine, means for reciprocating said block, and means yieldingly mounted on said block for engaging said boards and forcing them into jointed relation and in position to be gripped by said member and pushed to the discharge end of said machine.

6. In a machine of the character described, a longitudinally-moving gripping member adapted to receive and secure together a plurality of boards to be jointed, a reciprocating plunger mounted on said machine, means for reciprocating said plunger, and a plurality of fingers resiliently mounted thereon for engaging one of said boards and forcing it against the preceding board in position to be engaged and carried by said gripping member.

7. In a machine of the character described, a longitudinally-moving gripping member adapted to receive and secure together a plurality of boards to be jointed, a reciprocating plunger mounted on said machine, means for reciprocating said plunger, a plurality of fingers slidably mounted with respect to said plunger, and a plurality of compression springs mounted between said fingers and plunger, said fingers being so arranged with respect to said plunger as to engage one of the boards and force it against the preceding board in position to be carried by said member.

In witness whereof, I have hereunto affixed my signature.

DAPHNE SELDEN JONES,
*Administratrix of the Estate of Richard Cocke Jones, Deceased.*